United States Patent
Barthelemy et al.

(10) Patent No.: US 12,473,325 B2
(45) Date of Patent: Nov. 18, 2025

(54) TETRAMOLECULAR PARALLEL G-QUADRUPLEX-FORMING HYDROPHOBICALLY MODIFIED OLIGONUCLEOTIDES

(71) Applicants: INSTITUT NATIONAL DE LA SANTE ET DE LA RECHERCHE MEDICALE (INSERM), Paris (FR); CENTRE NATIONAL DE LA RECERCHE SCIENTIFIQUE, Paris (FR); UNIVERSITÉ DE BORDEAUX, Bordeaux (FR)

(72) Inventors: Philippe Barthelemy, Bordeaux (FR); Arnaud Gissot, Bordeaux (FR); Brune Vialet, Bordeaux (FR)

(73) Assignees: INSERM (INSTITUT NATIONAL DE LA SANTÉ ET DE LA RECHERCHE MÉDICALE), Paris (FR); CENTRE NATIONAL DE LA RECHERCHE SCIENTIFIQUE, Paris (FR); UNIVERSITÉ DE BORDEAUX, Bordeaux (FR)

( * ) Notice: Subject to any disclaimer, the term of this patent is extended or adjusted under 35 U.S.C. 154(b) by 1137 days.

(21) Appl. No.: 17/297,259

(22) PCT Filed: Nov. 28, 2019

(86) PCT No.: PCT/EP2019/082915
§ 371 (c)(1),
(2) Date: May 26, 2021

(87) PCT Pub. No.: WO2020/109470
PCT Pub. Date: Jun. 4, 2020

(65) Prior Publication Data
US 2024/0270782 A1    Aug. 15, 2024

(30) Foreign Application Priority Data
Nov. 30, 2018   (EP) ..................................... 18306595

(51) Int. Cl.
*C07H 21/04*    (2006.01)
(52) U.S. Cl.
CPC .................................. *C07H 21/04* (2013.01)
(58) Field of Classification Search
None
See application file for complete search history.

(56) References Cited

FOREIGN PATENT DOCUMENTS

| EP | 3 147 364 A1 | 3/2017 |
| WO | 2014/195430 A1 | 12/2014 |

OTHER PUBLICATIONS

Shi et al. J. Am. Chem. Soc. 2001, 123, 27, 6738-6739.*
Hotoda et al: "Biologically Active Oligodeoxyribonucleotides. 5.1 5'-End-Substituted d(TGGGAG) Possesses Anti-Human Immunodeficiency Virus Type 1 Activity by Forming a G-Quadruplex Structure", Journal of Medicinal Chemistry, vol. 41, No. 19, pp. 3655-3663, Sep. 1, 1998.
Malet et al: "Controlling G-quadruplex formation via lipid modification of oligonucleotide sequences", Chemical Communications, vol. 53, No. 84, pp. 11560-11563, Jan. 1, 2017.
Wolfe et al: "Modulation of Tetreplex Formation by Cheical Modifications of a G4-Containing Phosphorothioate Oligonucleotide" Journal of the American Chemical Society, vol. 118, No. 26, Jul. 3, 1996.

* cited by examiner

*Primary Examiner* — Patrick T Lewis
(74) *Attorney, Agent, or Firm* — WCF IP (57) ABSTRACT

The present invention relates to tetramolecular parallel G-quadruplex-forming oligonucleotides. If G-quadruplexes are of prime importance in biology, their use is hampered by the propensity of G4-prone DNA molecules, in particular G4-prone DNA molecules of long size, to adopt many different G4 topological conformations or other alternative foldings. By introducing a lipid modification at the end of the oligonucleotide, the inventors succeeded in obtaining long tetramolecular parallel G-quadruplexes (tp G4). The present invention thus concerns an oligonucleotide modified by substitution at the 5' or the 3' end by a lipid moiety, wherein said oligonucleotide comprises a nucleic acid sequence of at least 10 nucleotides, said nucleic acid sequence including a series of at least 4 consecutive guanine residues located at the 5' or 3' end of said sequence. A tetramolecular parallel G-quadruplex comprising 4 identical modified oligonucleotides as defined above, wherein each of the 4 consecutive guanine residues included at the 5' or 3' end of the nucleic acid sequence of each oligonucleotide respectively form G-quartets with the corresponding guanine residues of the other 3 oligonucleotides, said G-quartets being stabilized by π-π staking and Hoogsteen hydrogen bonding, is also contemplated.

15 Claims, 2 Drawing Sheets
Specification includes a Sequence Listing.

```
                        SEQUENCE LISTING

<160> NUMBER OF SEQ ID NOS: 6

<210> SEQ ID NO 1
<211> LENGTH: 20
<212> TYPE: DNA
<213> ORGANISM: Artificial Sequence
<220> FEATURE:
<223> OTHER INFORMATION: Synthetic 18143

<400> SEQUENCE: 1
tggggtctct cacaacaggc                                            20

<210> SEQ ID NO 2
<211> LENGTH: 20
<212> TYPE: DNA
<213> ORGANISM: Artificial Sequence
<220> FEATURE:
<223> OTHER INFORMATION: Synthetic 18144

<400> SEQUENCE: 2
ctctcacaac aggctggggt                                            20

<210> SEQ ID NO 3
<211> LENGTH: 20
<212> TYPE: DNA
<213> ORGANISM: Artificial Sequence
<220> FEATURE:
<223> OTHER INFORMATION: Synthetic 18145

<400> SEQUENCE: 3
ctctcacatg gggtacaggc                                            20

<210> SEQ ID NO 4
<211> LENGTH: 20
<212> TYPE: DNA
<213> ORGANISM: Artificial Sequence
<220> FEATURE:
<223> OTHER INFORMATION: Synthetic 18146
```

```
<400> SEQUENCE: 4 tttttctct cacaacaggc                                              20

<210> SEQ ID NO 5
<211> LENGTH: 20
<212> TYPE: DNA
<213> ORGANISM: Artificial Sequence
<220> FEATURE:
<223> OTHER INFORMATION: Synthetic 18147

<400> SEQUENCE: 5
ctctcacaac aggctttttt                                             20

<210> SEQ ID NO 6
<211> LENGTH: 20
<212> TYPE: DNA
<213> ORGANISM: Artificial Sequence
<220> FEATURE:
<223> OTHER INFORMATION: Synthetic 18148

<400> SEQUENCE: 6
ctctcacatt ttttacaggc                                             20
```

TETRAMOLECULAR PARALLEL G-QUADRUPLEX-FORMING HYDROPHOBICALLY MODIFIED OLIGONUCLEOTIDES

The present invention concerns tetramolecular parallel G-quadruplex-forming oligonucleotides.

Guanine-rich oligonucleotide sequences can self-assemble into four-stranded G-quadruplex supramolecular structures. These structures, which are stabilized by π-π stacking between G-quartets (G4) and via Hoogsteen hydrogen bonding have been found for instance in telomeric and promoter regions, where they participate in a diversity of biological processes. Due to their unique biological and biophysical properties, G-quadruplex supramolecular structures have been intensively investigated in different areas including supramolecular chemistry, nanotechnology or medicinal chemistry.

G-quadruplexes can fold with different strand stoechiometries (one to four strands), orientations (parallel, antiparallel, hybrid), and different number of G-quartets.

If G-quadruplexes are of prime importance in biology, their acceptance as useful and versatile supramolecular scaffolds is still hampered by the propensity of G4-prone DNA or RNA molecules to adopt many different G4 topological conformations (also called polymorphism), or other alternative foldings.

Obviously, the probability of forming undesired foldings from G4-prone oligonucleotide (ON) sequences increases with the ON length. Besides the above mentioned issues, tetramolecular G-quadruplexes structures exhibit very slow kinetics of formation due to the unfavorable entropy associated with the formation of a quaternary complex. Accordingly, it is not surprising that only short-size tetramolecular G-quadruplexes have been described so far.

If these shortcomings (kinetics and/or conformational diversity) were alleviated, tetramolecular G-quadruplexes would appear as attractive supramolecular scaffolds as they allow for the assembly of four strands in a perfectly controlled, predictable and unique tetramolecular architecture.

One obvious workaround consists in the synthesis of a spatially pre-organized complex where the four strands are covalently attached to a cyclic template. Kinetically speaking, this turns a high order quaternary complex into a more favorable first order process. Although very elegant, this strategy is of limited practical utility as it requires extensive synthetic work.

There is thus still an important need of tetramolecular G-quadruplexes with sufficiently rapid kinetics of formation and a low level of undesired foldings.

The present invention arises from the unexpected finding by the inventors that lipid modification of ON is very useful for the folding of otherwise unfavorable long tetramolecular parallel G-quadruplexes (tpG4).

Hybrid Lipid-OligoNucleotides (LONs) are emerging as a new class of synthetic biomolecules, suitable for therapeutic and technological applications. Their amphiphilic nature impart them with self-assembling properties and LONs were found to come in a diversity of different supramolecular structures depending on the length of the oligonucleotide sequence, the nature of the linker etc.

However, the possibility of forming long tpGA using LONs bearing a long DNA had not been disclosed nor suggested.

The present invention thus concerns an oligonucleotide modified by substitution at the 5' or the 3' end by a specific lipid moiety, of formula (I), wherein said oligonucleotide comprises a nucleic acid sequence of at least 10 nucleotides, said nucleic acid sequence including a series of at least 4 consecutive guanine residues located at the 5' or 3' end of said sequence.

The present invention also concerns a tetramolecular parallel G-quadruplex comprising 4 identical modified oligonucleotides as defined above, wherein each of the 4 consecutive guanine residues included at the 5' or 3' end of the nucleic acid sequence of each oligonucleotide respectively forms G-quartets with the corresponding guanine residues of the other 3 oligonucleotides, said G-quartets being stabilized by π-π staking and Hoogsteen hydrogen bonding.

Another object of the invention concerns a composition comprising tetramolecular parallel G-quadruplexes as defined above, wherein the tetramolecular parallel G-quadruplexes self-assembled into micelles. Indeed, the tetramolecular parallel G-quadruplexes as defined above are specific in that they are able to self-assemble into micelles.

The present invention further concerns the use of the composition as defined above as a vehicle.

The present invention also concerns the composition as defined above for use as a medicament.

Another object of the invention concerns the use of a tetramolecular parallel G-quadruplex as defined above in the manufacture of nanotechnology devices.

Another object of the invention relates to the tetramolecular parallel G-quadruplex as defined above for use as artificial implant.

DETAILED DESCRIPTION OF THE INVENTION

Oligonucleotide

As used herein, the term "oligonucleotide" refers to a nucleic acid sequence which may be 3'-5' or 5'-3' oriented. The oligonucleotide used in the context of the invention may in particular be DNA or RNA. In a particular embodiment, the oligonucleotide used in the context of the invention is DNA.

The oligonucleotide used in the context of the invention comprises or consists of a nucleic acid sequence, in particular a DNA sequence, of at least 10 nucleotides, preferably at least 11 nucleotides, at least 12 nucleotides, at least 13 nucleotides, at least 14 nucleotides or at least 15 nucleotides. In particular, the oligonucleotide used in the context of the invention comprises a nucleic acid sequence, in particular a DNA sequence, of 10 nucleotides to 100 kb. Preferably, the oligonucleotide used in the context of the invention comprises or consists of a nucleic acid sequence, in particular a DNA sequence, of at least 16 nucleotides, at least 17 nucleotides, at least 18 nucleotides, at least 19 nucleotides or at least 20 nucleotides. In a particular embodiment, the oligonucleotide used in the context of the invention comprises or consists of a nucleic acid sequence, in particular a DNA sequence, of 15 to 35 nucleotides, preferably of 20 to 30 nucleotides.

In the context of the invention, said nucleic acid sequence, in particular said DNA sequence, includes a series of at least 4 consecutive guanine residues located at the 5' or 3' end of said sequence.

In the context of the invention, the number of nucleotides forming the nucleic acid sequence defined above include the at least 4 consecutive guanine residues defined above.

By "located at the 5' or 3' end of the sequence" is meant herein that the series of guanine residues is located either at the 5' end or at the 3' end of the nucleic acid sequence, and fulfills the following formula (II) or (III):

5'-X1X2GGG(G)iX3(tail)-3' (II) or 5'-(tail)X3GGG(G)iX2X1-3' (III)

wherein:
X1 may be present or absent, preferably absent,
X2 is T, A or C, preferably T,
X3 is T, A or C, preferably T,
i is an integer of from 1 to 4, preferably i is 1,
(tail) is the remaining part of the nucleic acid sequence and preferably comprises from 5 to 60 nucleotides, preferably from 6 to 20 nucleotides, preferably from 10 to 22 nucleotides.
X1, when present, may be any nucleotide.
Preferably, the series of guanine residues is located at the 5' end of the nucleic acid sequence, and fulfills the following formula (II):

5'-X1X2GGG(G)iX3(tail)-3' (II)

wherein:
X1 may be present or absent, preferably absent,
X2 is T, A or C, preferably T,
X3 is T, A or C, preferably T,
i is an integer of from 1 to 4, preferably i is 1,
(tail) is the remaining part of the nucleic acid sequence and preferably comprises from 5 to 60 nucleotides, preferably from 6 to 20 nucleotides, preferably from 10 to 22 nucleotides.

Preferably, the oligonucleotide is linked to the divalent linker moiety Y of the compound of formula (I) on its extremity which contains the series of guanine residues.

Preferably, the oligonucleotide of formula (II) or (III) is linked to the divalent linker moiety Y of the compound of formula (I) via X1, when present, or X2.

The oligonucleotides used in the context of the invention may be further modified, preferably chemically modified, in order to increase the stability of the oligonucleotides in vivo. In particular, the oligonucleotide used in the context of the invention may comprise modified nucleotides.

Chemical modifications may occur at three different sites: (i) at phosphate groups, (ii) on the sugar moiety, and/or (iii) on the entire backbone structure of the oligonucleotide.

For example, the oligonucleotides may be employed as phosphorothioate derivatives (replacement of a non-bridging phosphoryl oxygen atom with a sulfur atom) which have increased resistance to nuclease digestion. 2'-methoxyethyl (MOE) modification (such as the modified backbone commercialized by ISIS Pharmaceuticals) is also effective.

Additionally or alternatively, the oligonucleotides of the invention may comprise completely, partially or in combination, modified nucleotides which are derivatives with substitutions at the 2' position of the sugar, in particular with the following chemical modifications: O-methyl group (2'-O-Me) substitution, 2-methoxyethyl group (2'-O-MOE) substitution, fluoro group (2'-fluoro) substitution, chloro group (2'-Cl) substitution, bromo group (2'-Br) substitution, cyanide group (2'-CN) substitution, trifluoromethyl group (2'-CF$_3$) substitution, OCF$_3$ group (2'-OCF$_3$) substitution, OCN group (2'-OCN) substitution, O-alkyl group (2'-O-alkyl) substitution, S-alkyl group (2'-S-alkyl) substitution, N-alkyl group (2'-N-akyl) substitution, O-alkenyl group (2'-O-alkenyl) substitution, S-alkenyl group (2'-S-alkenyl) substitution, N-alkenyl group (2'-N-alkenyl) substitution, SOCH$_3$ group (2'-SOCH$_3$) substitution, SO$_2$CH$_3$ group (2'-SO$_2$CH$_3$) substitution, ONO$_2$ group (2'-ONO$_2$) substitution, NO$_2$ group (2'-NO$_2$) substitution, N$_3$ group (2'-N$_3$) substitution and/or NH$_2$ group (2'-NH$_2$) substitution.

Additionally or alternatively, the oligonucleotides of the invention may comprise completely or partially modified nucleotides wherein the ribose moiety is used to produce locked nucleic acid (LNA), in which a covalent bridge is formed between the 2' oxygen and the 4' carbon of the ribose, fixing it in the 3'-endo configuration. These constructs are extremely stable in biological medium, able to activate RNase H and form tight hybrids with complementary RNA and DNA.

Accordingly, in a preferred embodiment, the oligonucleotide used in the context of the invention comprises modified nucleotides selected from the group consisting of LNA, 2'-OMe analogs, 2'-phosphorothioate analogs, 2'-fluoro analogs, 2'-Cl analogs, 2'-Br analogs, 2'-CN analogs, 2'-CF$_3$ analogs, 2'-OCF$_3$ analogs, 2'-OCN analogs, 2'-O-alkyl analogs, 2'-S-alkyl analogs, 2'-N-alkyl analogs, 2'-O-alkenyl analogs, 2'-S-alkenyl analogs, 2'-N-alkenyl analogs, 2'-SOCH$_3$ analogs, 2'-SO$_2$CH$_3$ analogs, 2'-ONO$_2$ analogs, 2'-NO$_2$ analogs, 2'-N$_3$ analogs, 2'-NH$_2$ analogs and combinations thereof. More preferably, the modified nucleotides are selected from the group consisting of LNA, 2'-OMe analogs, 2'-phosphorothioate analogs and 2'-fluoro analogs.

Additionally or alternatively, some nucleobases of the oligonucleotide may be present as desoxyriboses. That modification should only affect the skeleton of the nucleobase, in which the hydroxyl group is absent, but not the side chain of the nucleobase which remains unchanged.

In a preferred embodiment, the guanines of the series of at least 4 consecutive guanines included in the nucleic acid sequence, as defined above, are not modified nucleotides.

In a particularly preferred embodiment, the oligonucleotide used in the context of the invention comprises or consists of the sequence 5' TGG GGT CTC TCA CAA CAG GC 3' (SEQ ID NO: 1) or 5' CTC TCA CAA CAG GCT GGG GT 3' (SEQ ID NO: 2).

Lipid Conjugate

The present invention relates to an oligonucleotide modified by substitution at the 5' or the 3' end by a lipid moiety, wherein said modified oligonucleotide of the invention is of the general formula (I)

wherein:
Oligo is an oligonucleotide sequence and represents a nucleic acid sequence, preferably a DNA sequence, of at least 10 nucleotides, in particular of at least 15 nucleotides, said nucleic acid sequence including a series of at least 4 consecutive guanine residues located at the 5' or 3' end of the sequence, wherein said nucleic acid sequence may be oriented 3'-5' or 5'-3' and/or may comprise modified nucleotides;
Y represents a divalent linker moiety selected from ether —O—, thio —S—, amino —NH—, and methylene —CH$_2$—;

$R_3$ and $R_4$ may be identical or different and represent:
- a hydrogen atom,
- a halogen atom, in particular fluorine atom,
- a hydroxyl group, or
- an alkyl group comprising from 1 to 12 carbon atoms;

$L_1$ and $L_2$ may be identical or different and represent a saturated or unsaturated, linear or branched hydrocarbon chain comprising from 1 to 22 carbon atoms;

B is an optionally substituted nucleobase, selected from the group consisting of purine nucleobases, pyrimidine nucleobases, and non-natural monocyclic or bicyclic heterocyclic nucleobases wherein each cycle comprises from 4 to 7 atoms.

Preferably, the oligonucleotide sequence "Oligo-" is connected to the divalent linker moiety Y via a phosphate moiety —O—P(=O)(O)—, at its 3' or 5' end, advantageously at its 5' end.

Preferably, said series of guanine residues is located at the extremity of the divalent linker Y. This means that said series of guanine residues is located near the lipid extremity, rather than the other extremity.

In a preferred embodiment according to the invention, the modified oligonucleotide is of the general formula (I'):

wherein:
- Y, $R_3$, $R_4$, $L_1$, $L_2$ and B are as defined above in formula (I),
- [3' - - - 5'] represents, along with the $PO_3^-$ residue, an oligonucleotide as defined in the section "Oligonucleotide" herein above, and
- $A^+$ represents a cation, preferably $H^+$, $Na^+$, $K^+$ or $NH_4^+$.

In the formulae (I) and (I'), the divalent linker moiety Y is preferably ether —O—.

In the formulae (I) and (I'), $R_3$ and $R_4$ are preferably hydrogen atoms.

In a preferred embodiment according to the invention, the modified oligonucleotide is of the formula (I"):

wherein Y, $L_1$, $L_2$ and B are as defined above in formula (I), $A^+$ is a defined above in formula (I') and [3' - - - 5'] represents, along with the $PO_3^-$ residue, an oligonucleotide as defined in the section "Oligonucleotide" herein above.

In the formulae (I), (I') and (I"), $L_1$ and $L_2$ preferably represent a hydrocarbon chain, preferably a linear hydrocarbon chain, comprising from 6 to 22 carbon atoms, preferably from 8 to 18 carbon atoms, advantageously from 12 to 16 carbon atoms, more advantageously 15 carbon atoms.

In the formulae (I), (I') and (I"), B preferably represents a non substituted nucleobase selected from the group consisting of uracil, thymine, adenine, guanine, cytosine, 6-methoxypurine, 7-methylguanine, xanthine, 5,6-dihydrouracil, 5-methylcytosine, 5-hydroxymethylcytosine and hypoxanthine. Preferably, in the formulae (I), (I') and (I"), B represents a non substituted nucleobase selected from the group consisting of uracil, thymine, adenine, cytosine, 6-methoxypurine and hypoxanthine. More preferably, in the formulae (I), (I') and (I"), B represents uracil.

In a preferred embodiment according to the invention, the modified oligonucleotide is of the formula (I'''):

wherein $A^+$ is as defined above in formula (I') and [3' - - - 5'] represents, along with the $PO_3^-$ residue, an oligonucleotide as defined in the section "Oligonucleotide" herein above.

Tetramolecular Parallel G-Quadruplex

The present invention further concerns a tetramolecular parallel G-quadruplex comprising 4 identical modified oligonucleotides as defined above, wherein each of the 4 consecutive guanine residues included at the 5' or 3' end of the nucleic acid sequence of each oligonucleotide respectively form G-quartets with the corresponding guanine residues of the other 3 oligonucleotides, said G-quartets being stabilized by π-π staking and Hoogsteen hydrogen bonding.

By "tetramolecular parallel G-quadruplex" is meant herein a four-stranded nucleic acid structure, all four strands pointing in the same direction, comprising multiple stacked G-quartets, each of which consists of four guanine bases that associate in a cyclical manner through Hoogsteen hydrogen bonds and π-π staking and may be further stabilized though coordination to a cation in the center.

Figure 2:
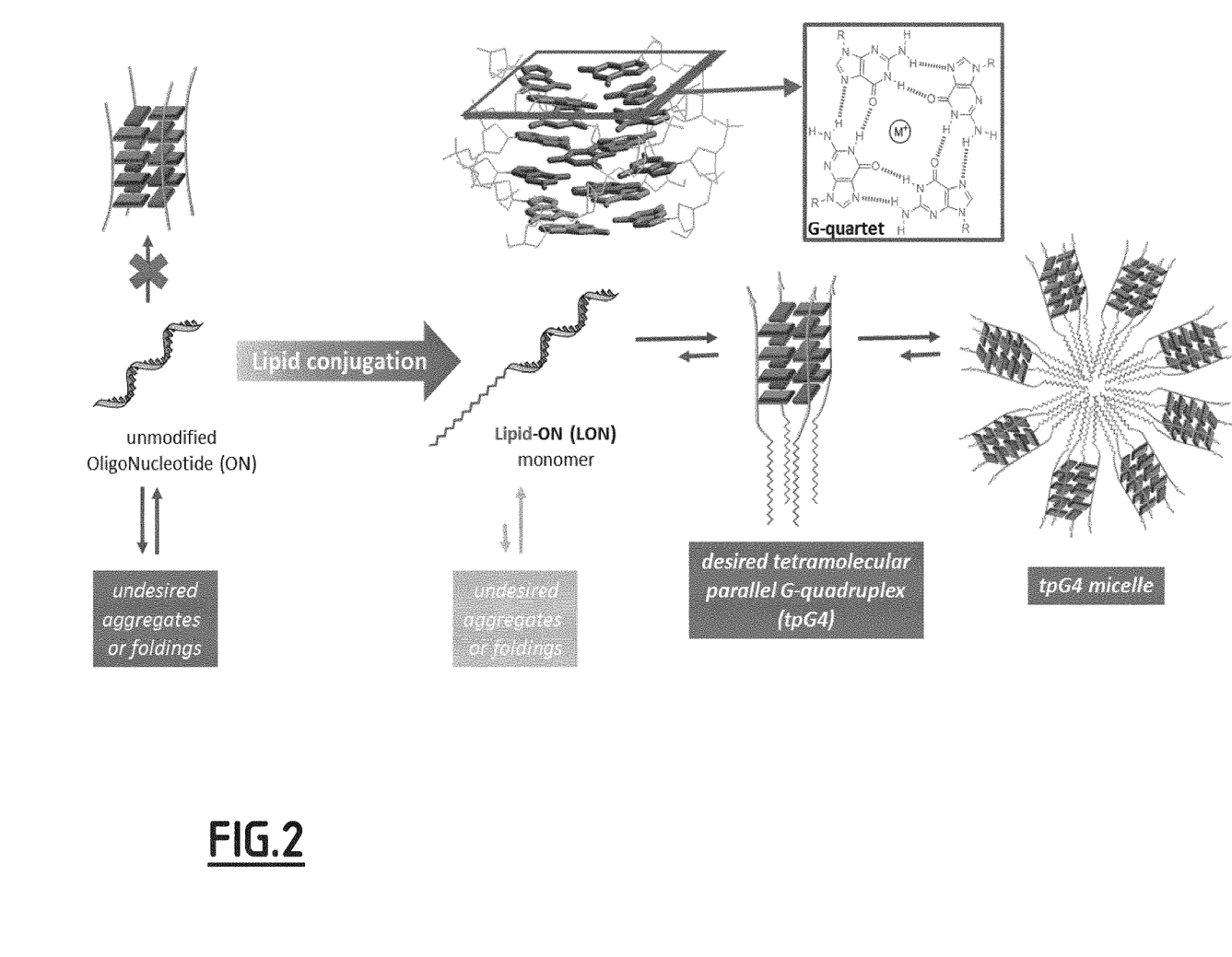
FIG. 2: Chemical scheme of a G-quartet.

G-quartets coordinated to a cation are typically represented on FIG. 2.

In a preferred embodiment, the tetramolecular parallel G-quadruplex of the invention further comprises a cation, which preferably coordinates said G-quartets.

Said cation may be a monovalent or a divalent cation. Examples of suitable cations include $K^+$ and $Mg^{2+}$.

In a preferred embodiment, said cation is a divalent cation, more preferably a $Mg^{2+}$ cation.

Composition

The present invention also provides a composition comprising tetramolecular parallel G-quadruplexes as defined above, wherein the tetramolecular parallel G-quadruplexes self-assembled into micelles.

A micelle is an aggregate of surfactant molecules dispersed in a liquid colloid. A typical micelle in aqueous solution forms an aggregate with the hydrophilic "head" regions of the molecules in contact with surrounding aqueous solvent, sequestering the hydrophobic "tail" regions of the molecules in the micelle centre.

The tetramolecular parallel G-quadruplexes of the invention self-assemble into micelles having a core/shell structure, wherein the shell is hydrophilic and is formed of the oligonucleotide parts of the G-quadruplexes, and wherein the core is lipophilic and is formed of the lipid moiety of the modified oligonucleotides constituting the G-quadruplexes.

The compositions may comprise up to 50% by weight of modified oligonucleotides, preferably from 0.1% to 40%, in particular from 1% to 20%, and especially from 8% to 15% by weight of modified oligonucleotides.

According to a preferred embodiment of the composition of the invention, it further comprises a hydrophobic active principle hosted in said micelles.

Said micelles can be used for the loading of hydrophobic drugs. Loading of such micelles with hydrophobic drug can vary between 10 nM and 2 mM.

The hydrophobic active principle is preferably selected from the group consisting of Paclitaxel, Docetaxel, Vincristine, Vinorelbine, and Abraxane; Tamoxifen, Gonadotrophin-releasing hormone (GnRH) agonists and antagonists, androgen receptor (AR) antagonist, and estrogen receptor (ER) antagonists; Cyclophosphamide, Chlorambucil and Melphalan; Methotrexate, Cytarabine, Fludarabine, 6-Mercaptopurine and 5-Fluorouracil; Doxorubicin, Irinotecan, Platinum derivatives, Cisplatin, Carboplatin, Oxaliplatin; Bicalutamide, Anastrozole, Examestane and Letrozole; Imatinib (Gleevec), Gefitinib and Erlotinib; Rituximab, Trastuzumab (Herceptin) and Gemtuzumab ozogamicin; Interferon-alpha; Tretinoin and Arsenic trioxide; Bevicizumab, Serafinib and Sunitinib.

Use as Vehicle

The present invention also concerns the use of a composition as defined in the section "Composition" hereabove as a vehicle.

As used herein, the term "vehicle" refers to a carrier of a medicinally and/or pharmaceutically active substance.

Preferably, the composition as defined in the section "Composition" hereabove is used as a carrier of sparingly hydrosoluble active principle.

Such a vehicle is notably useful for the administration of such active substance by way of intravenous, intraperitoneal, subcutaneous or oral routes, or direct hemoral injection.

The active principle is preferably selected from the group consisting of Paclitaxel, Docetaxel, Vincristine, Vinorelbine, and Abraxane; Tamoxifen, Gonadotrophin-releasing hormone (GnRH) agonists and antagonists, androgen receptor (AR) antagonist, and estrogen receptor (ER) antagonists; Cyclophosphamide, Chlorambucil and Melphalan; Methotrexate, Cytarabine, Fludarabine, 6-Mercaptopurine and 5-Fluorouracil; Doxorubicin, Irinotecan, Platinum derivatives, Cisplatin, Carboplatin, Oxaliplatin; Bicalutamide, Anastrozole, Examestane and Letrozole; Imatinib (Gleevec), Gefitinib and Erlotinib; Rituximab, Trastuzumab (Herceptin) and Gemtuzumab ozogamicin; Interferon-alpha; Tretinoin and Arsenic trioxide; Bevicizumab, Serafinib and Sunitinib.

Medical Indications

The present invention also concerns the composition as defined in the section "Composition" hereinabove for use as a medicament.

The invention also concerns the use of the composition as defined in the section "Composition" hereinabove for the manufacture of a medicament.

The present invention further concerns a method for treating a subject in need thereof, comprising administering to a subject in need thereof a therapeutically effective amount of a composition as defined in the section "Composition" hereinabove.

The composition is administered in an "effective amount", i.e. in an amount sufficient to treat the subject in need thereof. It will be appreciated that this amount will vary both with the effectiveness of the composition, in particular of the active principle hosted in the micelles of the composition, or other therapeutic agent employed, and with the nature of any carrier used. The determination of appropriate amounts for any given composition is within the skill in the art, through standard series of tests designed to assess appropriate therapeutic levels.

In the frame of the present invention, the individual preferably is a human individual. However, the veterinary use of the composition according to the present invention is also envisioned. The individual may thus also correspond to a non-human individual, preferably a non-human mammal.

The term "treating" is meant a therapeutic method, i.e. a method aiming at curing, improving a disease and/or extending the lifespan of an individual suffering from a disease.

Use in Nanotechnology

The present invention further concerns the use of a tetramolecular parallel G-quadruplex as defined above in the manufacture of nanotechnology devices.

In particular the tetramolecular parallel G-quadruplex as defined above may be used for the manufacture of nanostructures, of biosensors or nanomachines, of gels or films, and/or of organic semiconductors. For example, the tetramolecular parallele G-quadruplex as defined above may be used for the manufacture of nanowires, ion channels, stationary phases in chromatography or electrophoresis, gels, films and/or organic semi-conductors.

The present invention also concerns a method of manufacture of nanotechnology devices, such as nanostructures, biosensors or nanomachines, gels or films, and/or organic semiconductors, in particular nanowires, ion channels, stationary phases in chromatography or electrophoresis, gels, films and/or organic semi-conductors, said method comprising the use of a tetramolecular parallel G-quadruplex as defined above.

The tetramolecular parallel G-quadruplexes as defined above may also be used as artificial implants.

Accordingly, the present invention further concerns the use of a tetramolecular parallel G-quadruplex as defined above in the manufacture of artificial implants.

Another object of the invention relates to the tetramolecular parallel G-quadruplex as defined above for use as artificial implant.

The present invention will be further described by way of the examples below and the drawings in annex.

BRIEF DESCRIPTION OF THE FIGURES

- 5'G4=nucleic acid sequence 18143. «1»=1-LON with 18143; "k"=k-LON 18149.
- 3'G4=nucleic acid sequence 18144. «1»=1-LON with 18144; "k"=k-LON 18150.
- G4 intra=nucleic acid sequence 18145. «1»=1-LON with 18145; "k"=k-LON 18151.
- 5'T6=nucleic acid sequence 18146. «1»=1-LON with 18146; "k"=k-LON 18152.
- 3'T6=nucleic acid sequence 18147. «1»=1-LON with 18147; "k"=k-LON 18153.
- T6 intra=nucleic acid sequence 18148. «1»=1-LON with 18148; "k"=k-LON 18154.

Three states are visible on the gel: monomer (bottom), G4 (middle), micelle (top). The position of the 4 guanines residues influences the type of aggregate. Full micellar state is observed for 18149. Regarding the control thymines sequences (18146 to 18148 and k-LONs 18152 to 18154), the monomer band is clearly preponderant on all three positions.

EXAMPLE

This example shows that the lipid modification of a G4 prone oligonucleotide sequence with lipids drastically increases the probability of forming tetramolecular parallel G-quadruplexes over other different oligomers.

A) Materials and Methods

1. Automated DNA Synthesis and Purification of LONs

LONs were synthesized using the phosphoramidite methodology on an automated Expedite 8909 DNA synthesizer at the umol scale on 1000 Å primer support (loading: 30-100 µmol/g, Link technologies, Synbase Control Pore Glass). Prior to use, the phosphoramidites 1 of formula (IV)

(IV)

(to obtain 1-LONs) and 2 of formula (V)

(V)

were dried over $P_2O_5$ overnight and then dissolved in dry $CH_2Cl_2/CH_3CN$ 1/1 to a 0.1 M concentration (lipidic phosphoramidites did not dissolve in pure acetonitrile). N-benzylthiotetrazole was used for activation of the phosphoramidite prior to coupling. The phosphoramidites 1 and 2 were manually coupled last on the solid support by passing (via syringes) the activator and the phosphoramidite solution (0.25 mL) back and forth several times for 7 min. Deblocking and detachment from the solid support was achieved using 1 mL of a saturated aqueous $NH_4OH$ solution for 12 h at 55° C. The supernatant was collected and the CPG beads were washed 3 times with 0.25 mL of $EtOH/CH_3CN/H_2O$ 3/1/1 (vol). The solutions were pooled and evaporated (speed vac). k-LON are finally obtained.

k-LONs were purified by preparative PAGE using conventional protocols with 20*20*0.2 cm 20% polyacrylamide gels at a limiting power=15 W. The inventors developed an original electroelution protocol for the purification of the LONs. In short, the electrical wire that was plugged in the negative pole of the generator was manually modified by wrapping a platinum wire around the naked copper wire. The latter was immersed in the eluting buffer contained in a plastic pipette that was chopped off at both edges to 1) facilitate pouring of the eluting buffer on top and 2) increase the cross section at the bottom to minimize resistance to the current flow. The bottom of the syringe was blocked by polymerizing 0.5 mL of a 8% polyacrylamide solution (the bottom of the pipette being temporarily blocked by wrapping a parafilm foil around). After polymerization, the gel was prerun to remove any unpolymerized materials prior to loading the crushed acrylamide gel slab containing the LON (the TBE eluting buffer from the pipette can be withdrawn beforehand for practical reasons). A dialysis tubing (with a cutoff of 2 kDa) was adapted and wrapped with a parafilm foil around the bottom of the pipette to recover the sample after electroelution. This allowed the dialysis tubing to be immersed in a large quantity of eluting buffer at the bottom in the electrophoresis tank. The elution was carried out with an electrical power of 7-10 W to allow enough heat dissipation in the gel to favor denaturation of the LONs. The LONs were finally dialyzed against a 10 mM LiCl solution (not to favor G4 formation) followed by water. Yields of recovery were acceptable following this protocol (15-30% yield after purification of the crude material).

2. PAGE/Agarose Electrophoresis

Electrophoresis experiments were performed according to standard procedures with 1% agarose gels. PAGE were carried out with 15% polyacrylamide gels and run with a 100V limiting tension for native PAGE experiments.

3. Dynamic Light Scattering (DLS)

Particle size was determined using a Zetasizer 3000 HAS MALVERN. Experiments were realized with samples containing different concentration of LONs dissolved in deionized water or phosphate buffer. Measurements were performed at 25° C.

4. Taylor Dispersion Analysis (TDA, Discosizing)

TDA analyses were recorded on a Viscosizer TD (Malvern Instruments Ltd., Malvern, UK equipped with a 254 nm UV filter close to the $\lambda_{max}$ of oligonucleotides. Prior to analysis, the non-coated capillary has been prepared by injecting 1M NaOH during 30 min at 3000 mbar followed by 10 min rinse with water at 3000 mbar. The cellulose coated capillary has been prepared by injecting water during 30 min at 3000 mbar.

Internal Material (non-coated): fused silica, internal diameter: 75 µm, outer diameter: 360 µm, L1: 45 cm, L2: 85 cm, Total Length: 130 cm.

The samples were injected (pressure: 50 mbar), analyzed at 25° C. (Mobilization pressure: 140 mbar). Taylorgramms were recorded and analyzed with the viscosizer TD software 2.01 with a one component fit. Washing: 1 min of water between each sample, pressure: 3000 mbar.

5. TEM

TEM analyses were performed at the Bordeaux Imaging Center (BIC) of the University of Bordeaux using an Hitachi H7650 at a voltage of 80 kV. For sample preparation a drop of 100 nM solution of each LON, 2× selex salts was placed on a carbon film 200 Mesh copper grid and left to dry for 10 min. A drop of 1% uranyl acetate solution as a negative stain for 1 min was then added to the copper grid and left to dry.

Results

The oligonucleotide sequences used by the inventors were chosen to embark a G-tract of 4 consecutive guanines located in the middle of a 20-mer DNA sequence (18145, comparative), or at its 5' or 3' end (18143 or 18144, respectively). Controls were constituted by replacing the 4-consecutive guanines by thymines (sequences 18146, 18147 and 18148). The lipid was attached at the 5' end.

Specifically, the sequences were as follows:

| Name | Sequences |
|---|---|
| 18143 (invention) | 5' TGG GGT CTC TCA CAA CAG GC 3' (SEQ ID NO: 1) |
| 18149 (invention) | 5' (ketal NL) TGG GGT CTC TCA CAA CAG GC 3' (ketal NL with SEQ ID NO: 1) |
| 18144 (invention) | 5' CTC TCA CAA CAG GCT GGG GT 3' (SEQ ID NO: 2) |
| 18150 (invention) | 5' (ketal NL) CTC TCA CAA CAG GCT GGG GT 3' (ketal NL with SEQ ID NO: 2) |
| 18145 (comparative) | 5' CTC TCA CAT GGG GTA CAG GC 3' (SEQ ID NO: 3) |
| 18151 (comparative) | 5' (ketal NL) CTC TCA CAT GGG GTA CAG GC 3' (ketal NL with SEQ ID NO: 3) |
| 18146 (comparative) | 5' TTT TTT CTC TCA CAA CAG GC 3' (SEQ ID NO: 4) |
| 18152 (comparative) | 5' (ketal NL) TTT TTT GGC TCA CAA CAG GC 3' (ketal NL with SEQ ID NO: 4) |
| 18147 (comparative) | 5' CTC TCA CAA CAG GCT TTT TT 3' (SEQ ID NO: 5) |
| 18153 (comparative) | 5' (ketal NL) CTC TCA CAA CAG GCT TTT TT 3' (ketal NL with SEQ ID NO: 5) |
| 18148 (comparative) | 5' CTC TCA CATT TTT TA CAG GC 3' (SEQ ID NO: 6) |
| 18154 (comparative) | 5' (ketal NL) CTC TCA CATT TTT TA CAG GC 3' (ketal NL with SEQ ID NO: 6) |

NL = phosphoramidite of Table 1 below

The DNA molecule was modified at the 5'-end with the lipid phosphoramidites (Table 1).

TABLE 1

Phosphoramidites used in the example

| Name | Lipid moiety | Lipidic phosphoramidite used |
|---|---|---|
| ON | None (5'-OH) | None |
| 1-LON | $n$-$C_{18}H_{37}$ | 1 |
| k-LON | Ketal bis-$C_{15}$ | 2 |

The phosphoramidites 1 and 2 synthesized according to literature procedures and then coupled to the 5'-end of the DNA using an automated solid phase DNA synthesizer.

The sequences are the following:
- oligonucleotide sequence 18143 and its corresponding k-LON 18149 (see structure of formula (I''') above) are according to the invention (4G at its 5' end),
- oligonucleotide sequence 18144 and its corresponding k-LON 18150 are according to the invention (4G at its 3' end),
- oligonucleotide sequence 18145 and its corresponding k-LON 18151 are comparative (4G in the middle of the sequence),
- oligonucleotide control sequences 18146, 18147 and 18148 (and their corresponding k-LONs 18152, 18153 and 18154) were constituted by replacing the 4-consecutive guanines by thymines.

1-LONs with each of oligonucleotide sequences 18143 to 18148 were also obtained.

The purification of all these LONs offered a first insight at their self-assembling properties. When the lipid is attached at the 5'-end of the oligonucleotide, the capping step during the ON synthesis precludes abortive sequences from reacting with the lipid phosphoramidite. Consequently, the purification of these LONs is theoretically straightforward as only the desired full length ON is coupled to the lipid and somewhat interacts with the reverse stationary phase. An original polyacrylamide gel electrophoresis (PAGE) protocol for the purification of k-LON was therefore developed.

The nature of the supramolecular assemblies formed from these different LONs was investigated by non-denaturing PAGE. Interestingly, both the position of the 4G and the nature of the lipid were shown to impact the self-assemblies formed from these LONs (FIG. 1).

Figure 1:
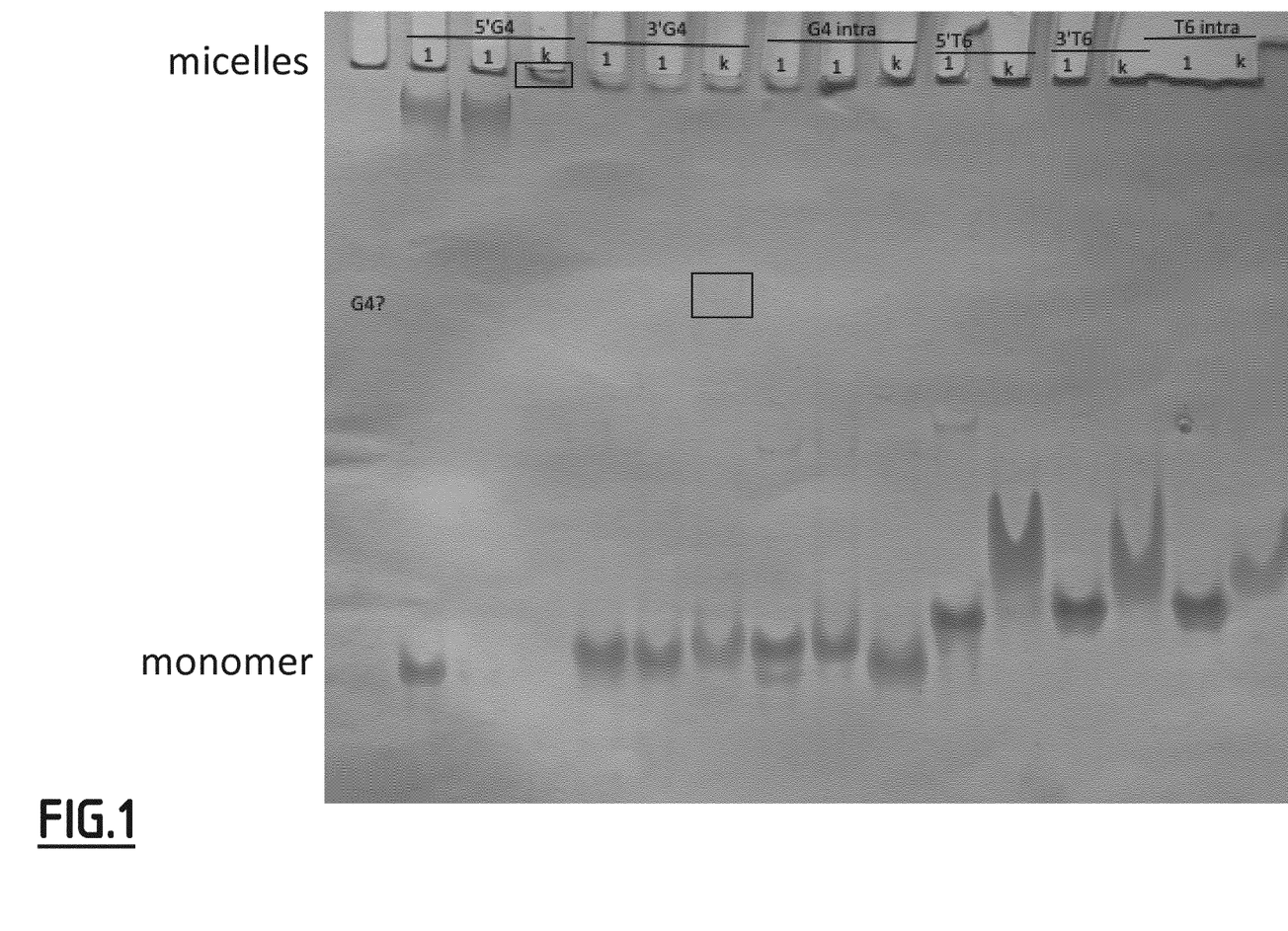
FIG. 1: Native 15% PAGE of the different LONs synthesized in the example in the presence of 1× intracellular salts (buffer TBE 0.5×, 150V migration, 3 h). 1× intracellular salts=140 mM KCl, 12 mM NaCl, 1 mM $MgCl_2$.

As shown in FIG. 1, the position of the 4 guanines residues influences the type of aggregate. Full micellar state is observed for k-LON 18149 (5'G4). Regarding the control thymines sequences (k-LONs 18152, 18153 and 18154; and 1-LONs), the monomer band is clearly preponderant on all three positions.

B) Material and Methods

Circular Dichroism (CD) Measurements:
CD spectra were performed on a JASCO 1500 spectrometer equiped with a pelletier bath temperature-controller.

The following mesurement parameters were used: range from 220 nm to 335 nm, 0.2 nm data pitch, 2 nm band width, 0.5 sec response, 100 nm scanning speed and 25° C. temperature. The resulting spectra were the average of two or three accumulations. Samples were prepared at 7.5 μM oligonucleotide, 20 mM phosphate buffer, and 50 mM KCl. The solutions were denaturated for 5 min at 90° C. then kept at room temperature for 2 h.

Melting Analysis:

Melting curves were obtained using the same spectrophotometer and samples.

The temperature ranged from 15° C. to 90° C. The holder was used as control sensor and the cell was used as monitor sensor. A 0.5 temperature gradient and 0.5 nm data pitch were used. Scanning speed was 200 nm/min.

The summary of the results which were obtained are the following (see Table 2):

TABLE 2

Results obtained with the different LON

| G4 position | 5' | Intra | 3' | Conclusion |
| --- | --- | --- | --- | --- |
| Lipid = ketal (k-LON) | k-LON 18149: ++ [a, b] Micelle+ Tm > 95° [c1] Tm > 95° [c2] Tm = 72.6° [c3] | k-LON 18151: + [b] Micelle+ Tm > 95° [c1] Tm = 69.8° [c2] | k-LON 18150: + [b] Micelle+ Tm > 95° [c1] Tm = 68.6° [c2] | Ketal 5'TG4T form stable micelles |
| Lipid = single chain (1-LON) | ++ [a, b] Micelle ? Tm > 95° [c1] | + [b] Micelle ? Tm > 95° [c1] | + [b] Micelle ? Tm > 95° [c1] | Single C18 5'TG4T form stable G4 |
| Without lipid | + [b] | + [b] | + [b] | Low CD signal |

++ means: stable G4
+ means: little G4 formation
[a] resulting from acrylamide and agarose gels
[b] resulting from CD signals under intracellular salt conditions: 150 mM KCl, 12 mM NaCl, 1 mM MgCl$_2$
[c1] means: intracellular salt conditions
[c2] means: melting observed under extracellular conditions: 145 mM NaCl, 5 mM KCl
[c3] means: melting observed without [K$^+$].

It results from the above that the oligonucleotides of the invention (k-LONs) are the only ones which can provide G4 formation, which are notably stable, as well as stable micelles.

When the series of guanine residues is located next to the lipid (such as for k-LON 18149), the modified oligonucleotide of formula (I) remains stable at high temperature. It forms stable micelles.

The invention claimed is:

1. An oligonucleotide modified by substitution at the 5' or the 3' end by a lipid moiety, wherein said modified oligonucleotide is of the general formula (I)

wherein:
Oligo is an oligonucleotide sequence and represents a nucleic acid sequence of at least 10 nucleotides, said nucleic acid sequence including a series of at least 4 consecutive guanine residues located at the 5' or 3' end of said sequence, wherein said nucleic acid sequence may be oriented 3'-5' or 5'-3' and/or may comprise modified nucleotides, and wherein said Oligo fulfills the following formula (II) or (III):

5'-X1X2GGG(G)iX3(tail)-3' (II), wherein X1 may be present or absent, or

5'-(tail)X3GGG(G)iX2X1-3' (III), wherein X1 is absent, and:

X1 is any nucleotide,
X2 is T, A or C,
X3 is T, A or C,
i is an integer of from 1 to 4,
(tail) is the remaining part of the nucleic acid sequence;

Y represents a divalent linker moiety selected from ether —O—, thio—S—, amino—NH—, and methylene—$CH_2$—;

$R_3$ and $R_4$ may be identical or different and represent:
  a hydrogen atom,
  a halogen atom,
  a hydroxyl group, or
  an alkyl group comprising from 1 to 12 carbon atoms;

$L_1$ and $L_2$ may be identical or different and represent a saturated or unsaturated, linear or branched hydrocarbon chain comprising from 1 to 22 carbon atoms;

B is an optionally substituted nucleobase, selected from the group consisting of purine nucleobases, pyrimidine nucleobases, and non-natural monocyclic or bicyclic heterocyclic nucleobases wherein each cycle comprises from 4 to 7 atoms.

2. The modified oligonucleotide according to claim 1, wherein said Oligo comprises a DNA sequence of 15 to 35 nucleotides, and/or said Oligo is connected to the divalent linker moiety Y via a phosphate moiety —O—P(=O)(O⁻)—, at its 3' or 5' end.

3. The modified oligonucleotide according to claim 1, wherein said Oligo fulfills the formula (II) or (III), wherein:
X1 is absent,
X2 is T, A or C,
X3 is T, A or C,
i is an integer of from 1 to 4,
(tail) comprises from 5 to 60 nucleotides, and/or
said series of guanine residues is located at the extremity of the divalent linker Y.

4. The modified oligonucleotide according to claim 1, wherein said oligonucleotide consists of the sequence 5' TGG GGT CTC TCA CAA CAG GC 3' (SEQ ID NO: 1) or 5' CTC TCA CAA CAG GCT GGG GT 3' (SEQ ID NO: 2).

5. The modified oligonucleotide according to claim 1, wherein it is of the general formula (I'):

(I')

wherein:
Y represents a divalent linker moiety selected from ether —O—, thio—S—, amino —NH—, and methylene —CH$_2$—,
$R_3$ and $R_4$ may be identical or different and represent:
 a hydrogen atom,
 a halogen atom,
 a hydroxyl group, or
 an alkyl group comprising from 1 to 12 carbon atoms,
$L_1$ and $L_2$ may be identical or different and represent a saturated or unsaturated, linear or branched hydrocarbon chain comprising from 1 to 22 carbon atoms,
B is an optionally substituted nucleobase, selected from the group consisting of purine nucleobases, pyrimidine nucleobases, and non-natural monocyclic or bicyclic heterocyclic nucleobases wherein each cycle comprises from 4 to 7 atoms,
[3' - - - 5'] represents, along with the PO$_3^-$ residue, an oligonucleotide sequence and represents a nucleic acid sequence of at least 10 nucleotides, said nucleic acid sequence including a series of at least 4 consecutive guanine residues located at the 5' or 3' end of said sequence, wherein said nucleic acid sequence may be oriented 3'-5' or 5'-3' and/or may comprise modified nucleotides, and wherein said Oligo fulfills the following formula (II) or (III):
5'-X1X2GGG(G)iX3(tail)-3' (II), wherein X1 may be present or absent, or
5'-(tail)X3GGG(G)iX2X1-3' (III), wherein X1 is absent, and:
X1 is any nucleotide,
X2 is T, A or C,
X3 is T, A or C,
i is an integer of from 1 to 4,
(tail) is the remaining part of the nucleic acid sequence, and
A$^+$ represents a cation.

6. The modified oligonucleotide according to claim 1, wherein it is of the formula (I"):

(I")

wherein
Y represents a divalent linker moiety selected from ether —O—, thio—S—, amino —NH—, and methylene—CH$_2$—,
$L_1$ and $L_2$ may be identical or different and represent a saturated or unsaturated, linear or branched hydrocarbon chain comprising from 1 to 22 carbon atoms,
B is an optionally substituted nucleobase, selected from the group consisting of purine nucleobases, pyrimidine nucleobases, and non-natural monocyclic or bicyclic heterocyclic nucleobases wherein each cycle comprises from 4 to 7 atoms,
A$^+$ represents a cation, and
[3' - - - 5'] represents, along with the PO$_3^-$ residue, an oligonucleotide sequence and represents a nucleic acid sequence of at least 10 nucleotides, said nucleic acid sequence including a series of at least 4 consecutive guanine residues located at the 5' or 3' end of said sequence, wherein said nucleic acid sequence may be oriented 3'-5' or 5'-3' and/or may comprise modified nucleotides, and wherein said Oligo fulfills the following formula (II) or (III):
5'-X1X2GGG(G)iX3(tail)-3' (II), wherein X1 may be present or absent, or
5'-(tail)X3GGG(G)iX2X1, -3' (III), wherein X1 is absent, and:
X1 is any nucleotide,
X2 is T, A or C,
X3 is T, A or C,
i is an integer of from 1 to 4,
(tail) is the remaining part of the nucleic acid sequence.

7. A tetramolecular parallel G-quadruplex comprising 4 identical modified oligonucleotides as defined in claim 1, wherein each of the 4 consecutive guanine residues included at the 5' or 3' end of the nucleic acid sequence of each oligonucleotide respectively form G-quartets with the corresponding guanine residues of the other 3 oligonucleotides, said G-quartets being stabilized by π-π staking and Hoogsteen hydrogen bonding.

8. The tetramolecular parallel G-quadruplex according to claim 7, wherein said G-quadruplex further comprises a divalent cation which coordinate said G-quartets.

9. The tetramolecular parallel G-quadruplex according to claim 8, wherein said divalent cation is a Mg$^{2+}$ cation.

10. A composition comprising tetramolecular parallel G-quadruplexes according to claim 7, wherein the tetramolecular parallel G-quadruplexes self-assembled into micelles.

11. The composition according to claim 10 further comprising a hydrophobic active principle hosted in said micelles.

12. A vehicle comprising the composition according to claim 10.

13. A method for treating a subject in need thereof, comprising administering a composition according to claim 10 to said subject.

14. A method for manufacturing nanotechnology devices, comprising the use of a tetramolecular parallel G-quadruplex according to claim 7.

15. An artificial implant comprising a tetramolecular parallel G-quadruplex according to claim 7.

* * * * *